(No Model.) 2 Sheets—Sheet 2.
F. ECAUBERT.
METAL WORKING LATHE.
No. 257,676. Patented May 9, 1882.
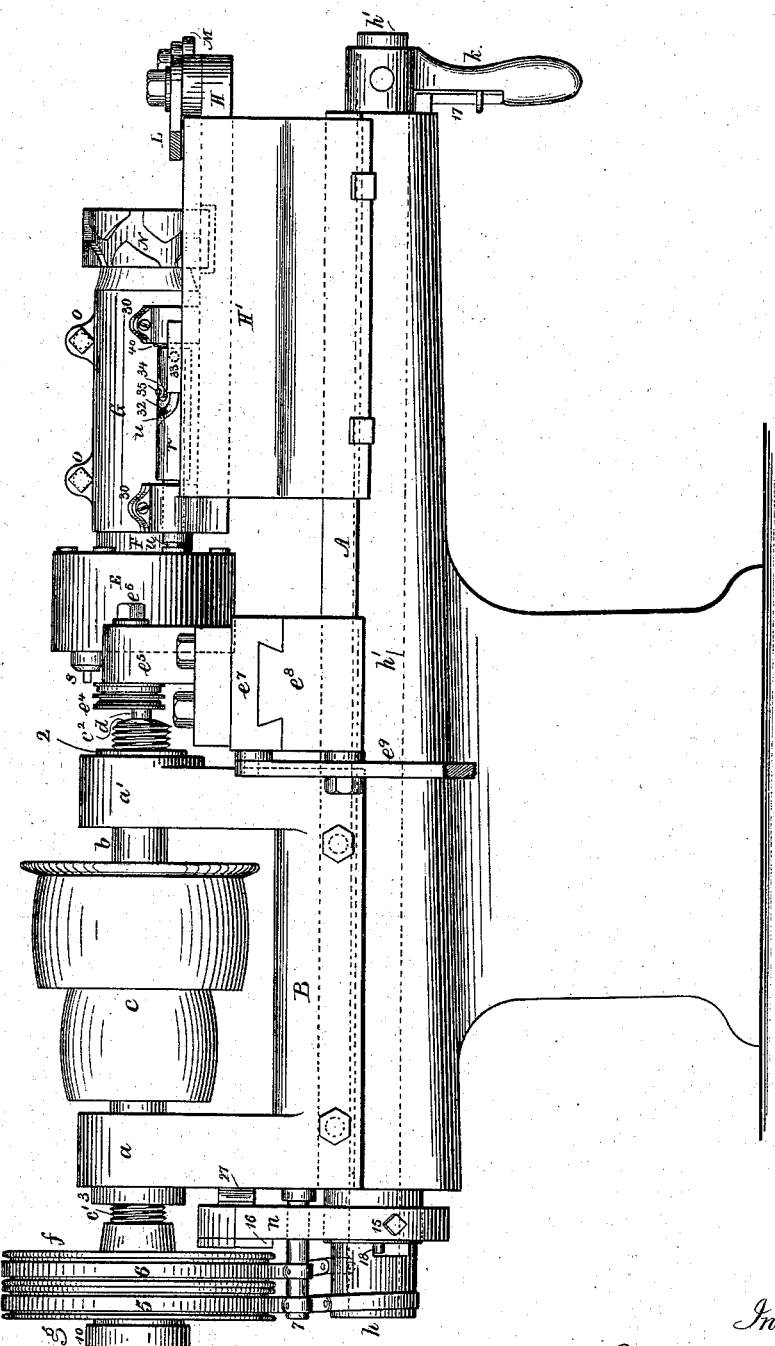

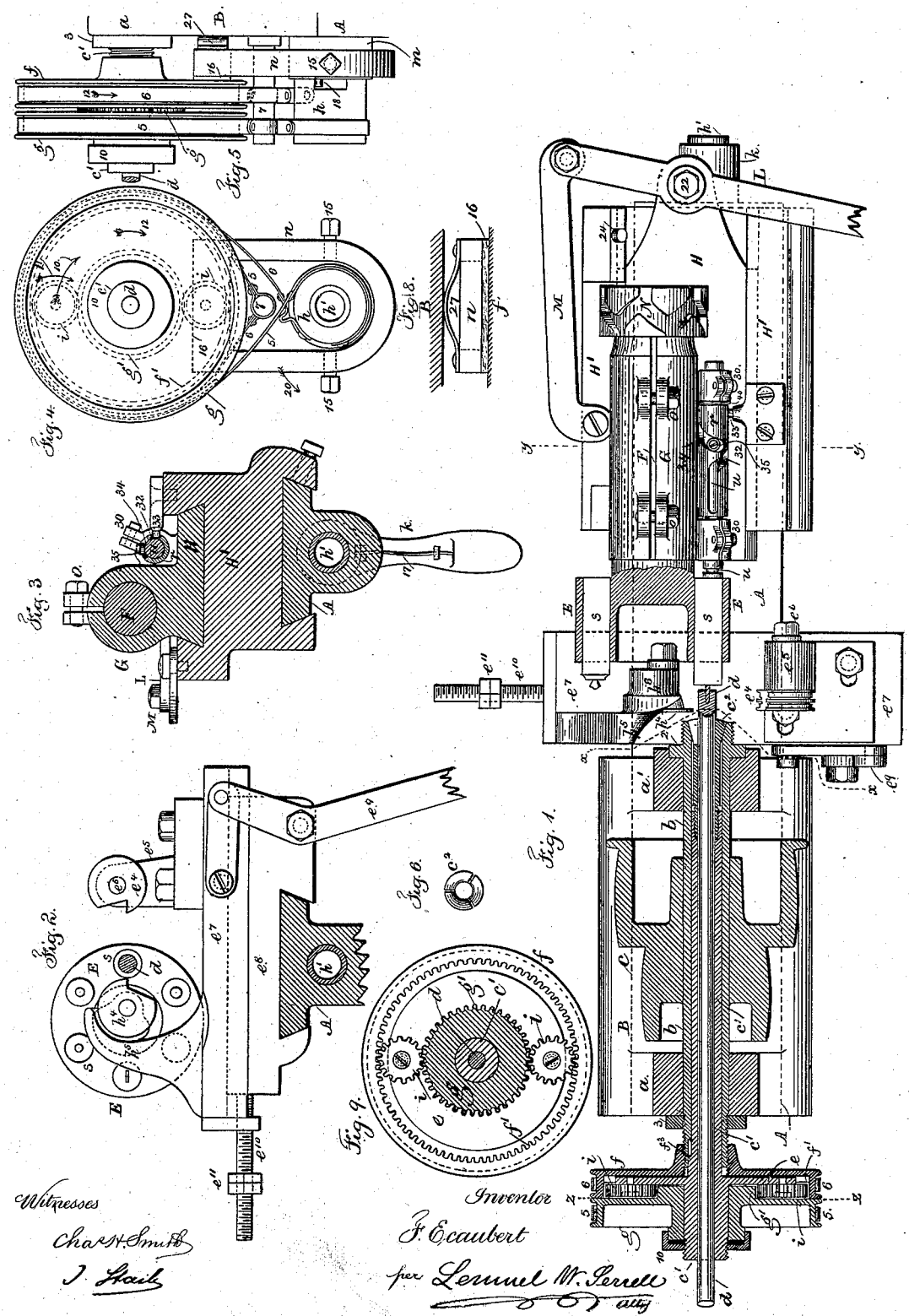

UNITED STATES PATENT OFFICE.

FRÉDÉRIC ECAUBERT, OF NEW YORK, N. Y.

METAL-WORKING LATHE.

SPECIFICATION forming part of Letters Patent No. 257,676, dated May 9, 1882.

Application filed January 13, 1881. (No model.)

*To all whom it may concern:*

Be it known that I, FRÉDÉRIC ECAUBERT, of the city and State of New York, have invented an Improvement in Metal-Working Lathes, of which the following is a specification.

Lathes have been made for carrying a number of tools in a head to be brought into action successively upon the material that is being revolved, so as to bore, countersink, screw, and otherwise prepare such revolving material. These tools have usually been placed radially in a revolving head, and in case of any inaccuracy in the adjustment of the stock of the tool the inaccuracy is augmented by divergence of the tool, and as the holding device for the head is usually of less diameter than a circle passing through the points of the tools any inaccuracy in the revolving and holding devices is augmented.

In my lathe I provide a means for holding and rotating the rod of material to be operated upon, clamping and liberating mechanism that are operative while the parts are being revolved, so that the lathe does not require to be stopped, and mechanism under the control of the workman which brings into action the clamping and liberating mechanism by power derived from the rotation of the lathe-mandrel.

I provide a cylindrical tool-holder in which the different tools are in parallel stocks, and the tool-holder is revolved progressively, and given an end movement and held firmly while each tool in succession is brought into action. The tool-holding cylinder is made with reference to passing up toward the revolving mandrel and sliding over the stock of a cutter that is brought up at the proper time to separate the article that has been formed from the rod or blank.

In the drawings, Figure 1 is a plan view with the mandrel and tool-holder in section. Fig. 2 is a cross-section at $x\ x$. Fig. 3 is a cross-section at $y\ y$. Fig. 4 is a view of the wheels at the back end of the mandrel. Fig. 5 is an edge view of such wheels. Fig. 6 is an end view of the holding-chuck. Fig. 7 is an elevation of my improved lathe complete. Fig. 8 is a plan of the strap, bearing-spring, and friction-pad, more particularly described hereinafter; and Fig. 9 is a section at the line $z\ z$ of Fig. 1.

The bed A of the machine is preferably made as a Y-shaped slide-bar, and the same is suitably supported. Upon this bed A there is fastened a mandrel-head, B, having two bearings, $a\ a'$, for the mandrel or shaft $b$. This mandrel has a collar, 2, at one end and a nut, 3, at the other to prevent end motion; but at the same time it can be freely rotated by power applied to the pulley $c$.

The mandrel $b$ is hollow, and through it passes the chuck-tube $c'$ at the end of which is the chuck $c^2$, the same having a conical head split, as seen in Fig. 6', so that when drawn endwise in the mandrel $b$ the conical head will be caused to grasp and hold a rod or bar, $d$, or other blank to be operated upon by the tools, as hereinafter described. This chuck $c^2$ is preferably a separate piece from the tube $c'$, as shown, the parts being screwed together, so that a different chuck may be introduced of a size and shape adapted to the blank to be operated upon.

There is a feather, $f^3$, in the tube $c'$, entering a groove in the mandrel $b$, so that the two will rotate together; but the tube $c'$ may receive an end motion. This tube $c'$ has upon it a disk, $e$, and on one side of this there is a shell-wheel, $f$, having a female screw at its central opening passing upon the outside of the mandrel $b$ at its rear end. At the other side of the disk $e$ there is a second shell-wheel, $g$.

There are grooves in the peripheries of the shell-wheels, in which are the friction straps or bands 5 and 6. One end of each band is made as a loop that passes over the fixed stud 7, and the bands pass in opposite directions over the respective wheels $f$ and $g$ and partially around the rocker-cylinder $h$, to which the said ends of the straps 5 and 6 are attached.

There is a tube, $h'$, passing through the bed A, to one end of which the rocker-cylinder $h$ is affixed, and to the other end the handle $k$ is attached, and there is a spring, 17, upon the end of bed A that enters a lug on the handle $k$ and holds the parts in a normal position, but allows the tube and rocker-cylinder $h$ to be moved by the handle.

When the parts are in a normal position the wheels $f$ and $g$ are free to revolve with the tube $c'$ and mandrel $b$, because the straps 5 and 6 are loose.

If the cylinder $h$ is rocked in one direction, the wheel $g$ will be held by its strap 5 and the wheel $f$ will be free. If rocked in the other direction, the wheel $f$ will be held by its strap 6 and the wheel $g$ will be free.

The nut 10 at the back end of tube $c'$ holds the wheels $f$ and $g$ in their proper places endwise of said tube $c'$; but they are free to revolve on tube $c'$.

It will now be evident that while the mandrel of the lathe is revolving in the usual manner, with the top of the pulley $c$ moving toward the workman, if he moves the handle $k$ and cylinder $h$ so as to tighten the strap 6 and hold the wheel $f$, the mandrel $b$, continuing to revolve, its screw at the back end will force the wheel $f$ to the left, or away from the bearing $a$, and in so doing the wheel $f$ acts against the disk $e$, gives end motion to the tube $c'$, and by the chuck $c^2$ clamps the rod $d$ and holds it firmly until liberated.

I arrange to give a reverse movement to the wheel $f$ and liberate the rod by the following means: When the rocker-cylinder $h$ is moved the reverse way and tightens the strap 5 the wheel $g$ will be held. This wheel $g$ has a central gear, $g'$, and there are planet-wheels $i$ $i$ upon studs on the disk $e$, and there is an internal gear, $f''$, around the inside of the shell $f$. Hence as the disk $e$ revolves with the mandrel it carries the axes of the planet-wheels $i$ around in the direction of the arrow 10, Fig. 4, and the wheel $g$ being held, the wheels $i$ are revolved in the direction of arrow 11, and these give to the wheel $f$ a movement, as shown by arrow 12, in the same direction as the mandrel, but faster, and hence the nut of $f$ is run upon the rear end of the mandrel, the chuck-tube $c^2$ moved endwise, and the rod $d$ liberated. It is to be understood that when the wheel $f$ is held by its strap the wheel $g$ is free to be revolved by the wheels $i$ $i$, that intervene between $f$ and $g'$, and are carried around by the disk $e$.

A careless workman might hold the handle $K'$ too long and run the nut of $f$ up against the rear nut, 3, and jam the parts or break the gearing. I prevent this by placing a hub, $m$, around the tube $h'$, between the rocker-cylinder $h$ and frame $A$, and to this hub the U-shaped strap $n$ is pivoted by the screws 15. Said strap carries at its upper end a friction-pad, 16, with a spring, 27, at the opposite side pressing against the bearing $a$, and there is a pin, 18, on the hub $m$ entering a slot in the cylinder $h$, as seen in Fig. 5. If, now, the wheel $f$ is screwed too far upon the rear end of the mandrel, the movement of the same increases the friction upon the pad 16 and tends to move the strap in the direction of the arrow 20, Fig. 4, and the pin 18, acting upon the hub of the rocker $h$, eventually exerts so much power that the rocker $h$, tube $h'$, and handle $k$ are moved against the holding force of the workman and the parts restored to a normal position, and the contact of the pad 16 against the side of the wheel $f$ will hold it slightly while the revolution of the mandrel causes its screw to move the wheel $f$ away from the pad until all parts assume a normal position, ready for the strap 6 to be held and the rod clamped as before.

Any other character of friction-pad acting against the surface of the wheel $f$ may be made use of to turn the cylinder $h$ and liberate the friction-straps 5 or 6. Such friction-pad may be in the form of a shell or disk, adjacent to the wheel $f$, and geared to the cylinder $h$.

The tool-holder E is cylindrical, and is mounted upon the end of an arbor, F, revolving in the hollow stock G upon the bed-plate H.

The stock G is not a complete cylinder, but it is open at one side, and the bolts $o$ serve to apply the pressure necessary to partially close the stock and compensate for wear from time to time.

The plate H is moved endwise in its bed $H'$ by means of the lever L, that is pivoted at 22 to the plate H, and its outer end is connected by the link M to a pivot on the bed $H'$.

There is a circular cam, N, at the rear end of the arbor F, the groove of which is zigzag, as shown, and the pin 24 on the bed $H'$ acts in this groove to turn the cam and the tool-holder around progressively as the bed-plate H and said cam are moved back and forth in contact with this pin.

It is to be understood that the tool-holding cylinder is provided with parallel holes through it, which receive the stocks $s$ of the various tools. For instance, one stock may be a gage to determine the distance the rod $d$ is to be projected for each operation; the next tool may act to bore a central hole of one size; the next to countersink such hole; the third to cut a screw-thread; the fourth to finish off the end of the blank, and so on according to what has to be done, and the number of stocks and tools may be greater or less than those shown. They all, however, are parallel, and they are easily made perfectly in line with the axis of the mandrel by placing in that mandrel the tool that bores the holes for the stocks when constructing the lathe.

I remark that it is important to hold each tool perfectly in position after the cam N has operated to turn the arbor F and tool-holding cylinder E. For this purpose I provide on the plate H a pair of bearings, 30, for the centering-bolt $u$ to slide endwise therein, and the end of this bolt is slightly tapering, and passes into one of a series of holes at the back of the tool-holding cylinder E. This bolt is guided by a feather, so that it can only be moved endwise; but around it is a sleeve, $r$, that can be partially revolved by an inclined slot, 32, and a stationary pin, 33, on the frame $H'$, and there is an inclined slot, 34, in this sleeve and a pin, 35, projecting from the bolt $u$, so that when the sleeve is turned in one direction by the pin 33 in the slot 32 its partial revolution causes the slot 34 to draw back the bolt $u$ from the tool-holding cylinder, and when the sleeve is turned the other way its slot moves the pin and bolt forward and engages and holds the cylinder E. There is a corrugated washer at 40 that allows the parts to yield slightly as the bolt presses against the tool-holding cylinder, and this prevents any looseness in the parts, because the corrugated washer forms a bearing against which the sleeve $r$ rests as it presses upon the pin 35 to move the bolt $u$ into its place. Hence, if there is any slight inaccuracy in the size of the holes in E for the bolt $u$, or any inequality from wear, the corrugated washer will compensate for this, because it is more or less compressed each time the sleeve is moved to give the end motion to the bolt.

In order to turn off the outer surface of the rod or blank, I make use of a cutter, $e^4$, that is secured to the head $e^5$ by means of a bolt, $e^6$. It is preferable that this cutter be made circular, with its periphery shaped the reverse of the surface of the article to be turned up, and that a notch be made in this disk, so as to form a cutting-edge, as seen in Figs. 1 and 2, so that the article can be turned up to shape by bringing the cutter up against the blank, and the cutter can be sharpened by grinding at the notch.

The cutter-head $e^5$ is fastened to a slide, $e^7$, moving upon the rest or bed $e^8$, that is transverse to the main bed A, and is adjustable thereon to bring the cutter to the proper position.

There is a lever, $e^9$, by means of which the slide $e^7$ can be moved to bring into action the tool $e^4$, and a screw, $e^{10}$, with a stop-nut; $e^{11}$, upon it, limits the movement of the slide and cutter $e^4$ as it is brought up to the blank.

There is a second cutter, $h^4$, upon a head, $h^5$, for separating the article from the rod $d$ after it has been turned up. This head is upon the cross-slide $e^7$, so that the cutter $h^4$ is brought into action by moving the lever $e^9$ the reverse way to the movement that brings up the cutter $e^4$.

If the head $h^5$ were made in the ordinary manner—such, for instance, as the head $e^5$—then it would come in the way of the boring or milling tools carried by the tool-holding cylinder E unless the slide $e^7$ were long enough for the head $h^5$ and its cutter to be entirely behind the head E and tools, and this would involve a considerable movement to the slide $e^7$ to bring first one tool into action and then the other. To avoid this I make the portion of the head $h^5$ which holds the tool $h^4$ a cylinder or hub, $h^3$, that projects at one side of the standard $h^5$, and the tool $h^4$ is on line, or nearly so, with that face of the standard $h^5$ that is next to the cylinder E.

This construction allows for the standard and tool occupying the position shown in Fig. 1 without being in the way of any of the tools; and the tool-holder E being in the form of a cylinder, it does not come into contact with the hub that projects from the standard and holds the tool $h^4$, and said tool is close to the blank $d$, and does not have to be moved far when brought into action.

The blank or rod $d$ may be of any desired length, and it may be fed up automatically by a weight acting upon a cord or wire that passes over a pulley and runs through the tube $h'$, and is attached to an arm at the rear end of said rod $d$, so as to draw the rod along and up to a gage every time the rod is liberated from the holding action of the chuck.

It will be evident that the friction-straps 5 and 6 might be actuated by a lever connected directly to the cylinder $h$, or in any analogous manner.

I am aware that in lathes a clamping-bearing has been made of a cap-piece over a rigid bed and formed therewith at one side and clamped by a bolt at the other side. As there is only one part that can yield or spring under the action of the bolt, the parts, if worn, become untrue. In my improvement both sides of the hollow stock G will spring slightly and equally under the action of the bolts $o$, and wear can be compensated for and the parts will not be thrown out of adjustment.

I claim as my invention—

1. The combination, with the revolving tubular mandrel, of a tubular chuck within the mandrel, a wheel with an internal screw screwing upon the rear part of the tubular mandrel, mechanism, substantially as specified, for detaining the wheel and causing the screw to give end motion to the clamping-chuck, and means for revolving the screw-wheel more rapidly than the mandrel to screw the wheel in the other direction and liberate the article clamped by the chuck without stopping the rotation of the mandrel, substantially as specified.

2. The combination, with the hollow mandrel and the chuck, of the wheels $f$ and $g$, disk $e$, pinions $i$, internal and external gears, and friction-bands 5 and 6, substantially as set forth, whereby the chuck is operated during the revolution of the mandrel, substantially as set forth.

3. The combination, with the mandrel, chuck-wheels $f$ and $g$, and bands 5 and 6, of the cylinder $h$ and lever $k$, substantially as set forth.

4. The combination, with the tubular mandrel and chuck, of the wheels $f$ and $g$, intermediate gearing, straps 5 and 6, cylinder $h$, and friction-pad acting against the wheel $f$, for the purposes and substantially as set forth.

5. The friction-pad 16, swinging strap $n$, and pin 18, in combination with the cylinder $h$, straps 5 and 6, wheels $f$ and $g$, mandrel, and chuck, substantially as set forth.

6. The cylindrical tool-holder having parallel holes, a circular range of parallel tool-stocks, and the arbor F, in combination with the stock G, bed H, zigzag cam N, stud 24, and mechanism for moving the bed back and forth, substantially as set forth.

7. The bolt $u$, pin 35, slotted sleeve $r$, and stud 33, in combination with the tool-holding cylinder E and mechanism for reciprocating the same and revolving it progressively, substantially as set forth.

8. In a lathe having a reciprocating tool-holding cylinder, a head having a hub that projects toward the central recessed portion of the tool-holding cylinder, and a tool supported upon such hub, in combination with mechanism for moving the hub and tool transversely of the lathe, as and for the purposes set forth.

9. The combination, in a lathe, of a revolving mandrel, a holding-chuck, a tool-holding cylinder having parallel holes for the tool-stocks, the mechanism for turning the cylinder progressively and holding it, an external shaping-cutter, a separating-cutter, and a transverse sliding bed with heads for holding such cutters, and mechanism for moving and stopping the bed, substantially as specified.

Signed by me this 5th day of January, A. D. 1881.

FRÉDÉRIC ECAUBERT.

Witnesses:
GEO. T. PINCKNEY,
WILLIAM G. MOTT.